United States Patent
Shibata et al.

[11] Patent Number: 6,127,064
[45] Date of Patent: Oct. 3, 2000

[54] JAR CAN FOR SECONDARY BATTERY

[75] Inventors: Kenichiro Shibata, Itami; Yoshio Moriwaki; Isao Matsumoto, both of Kadoma, all of Japan

[73] Assignees: Sumitomo Electric Industries, Ltd., Kadoma; Matsushita Electric Industrial Co., Ltd., Osaka, both of Japan

[21] Appl. No.: 09/138,754

[22] Filed: Aug. 24, 1998

[30] Foreign Application Priority Data

Aug. 29, 1997 [JP] Japan ................................ 9-234842
Jul. 22, 1998 [JP] Japan ............................... 10-206687

[51] Int. Cl.$^7$ .................................................... H01M 2/02
[52] U.S. Cl. ..................... 429/163; 429/168; 429/176; 429/166; 429/164
[58] Field of Search ............................ 429/176, 163, 429/168

[56] References Cited

U.S. PATENT DOCUMENTS

| | | | |
|---|---|---|---|
| 4,216,275 | 8/1980 | Hartmann et al. | 429/104 |
| 5,840,441 | 11/1998 | Hirofumi et al. | 429/176 |
| 5,976,731 | 11/1999 | Negoro et al. | 429/328 |

FOREIGN PATENT DOCUMENTS

| | | |
|---|---|---|
| 0307929 | 3/1989 | European Pat. Off. . |
| 47-046081 | 12/1972 | Japan . |
| 03134949 | 6/1991 | Japan . |
| 05074483 | 3/1993 | Japan . |
| 05074484 | 3/1993 | Japan . |
| 06015465 | 1/1994 | Japan . |
| 06052842 | 2/1994 | Japan . |
| 06108286 | 4/1994 | Japan . |
| 06179083 | 6/1994 | Japan . |
| 07094153 | 4/1995 | Japan . |
| 07122246 | 5/1995 | Japan . |
| 08024972 | 1/1996 | Japan . |
| 08329908 | 12/1996 | Japan . |
| 09129265 | 5/1997 | Japan . |
| 10228888 | 8/1998 | Japan . |

OTHER PUBLICATIONS

"Properties of Stainless Steel–clad Aluminum Sheet Metals", by Shojiro Oie; Kobe Steel Engineering Reports/vol. 39, No. 3 (1989), pp. 61–64.

*Primary Examiner*—Maria Nuzzolillo
*Assistant Examiner*—Angela J. Martin
*Attorney, Agent, or Firm*—W. F. Fasse; W. G. Fasse

[57] ABSTRACT

A jar can for a secondary battery is formed by deep-drawing a clad material prepared by bonding an aluminum sheet and an iron sheet to each other. A nickel layer is formed between the iron sheet and the aluminum sheet. Another nickel layer is formed on another surface of the iron sheet. Thus, a lightweight jar can for a secondary battery having high rigidity is obtained.

19 Claims, 4 Drawing Sheets

JAR CAN FOR SECONDARY BATTERY

BACKGROUND OF THE INVENTION

1. Field of the Invention

The present invention relates to a jar can for a secondary battery, and more particularly, it relates to a jar can for a secondary battery which is lightweight and attains high rigidity.

2. Description of the Prior Art

Following the remarkable spread of portable telephones and portable electronic apparatuses in recent years, miniaturization and weight reduction of such apparatuses are increasingly required. These apparatuses require miniature and lightweight sealed batteries having high storage capacity. Thus, thin angular batteries having prismatic shapes are increasingly required in place of conventional cylindrical batteries. The sealed batteries include a nickel-hydrogen storage battery, a lithium ion secondary battery and the like, for example.

Figure 5A:
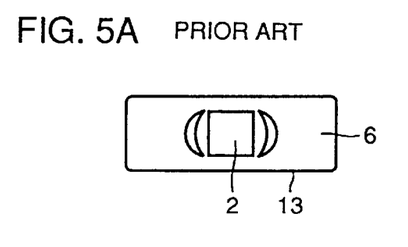
FIG. 5A is a top plan view of a nickel-hydrogen storage battery employing a conventional jar can.
Figure 5B:
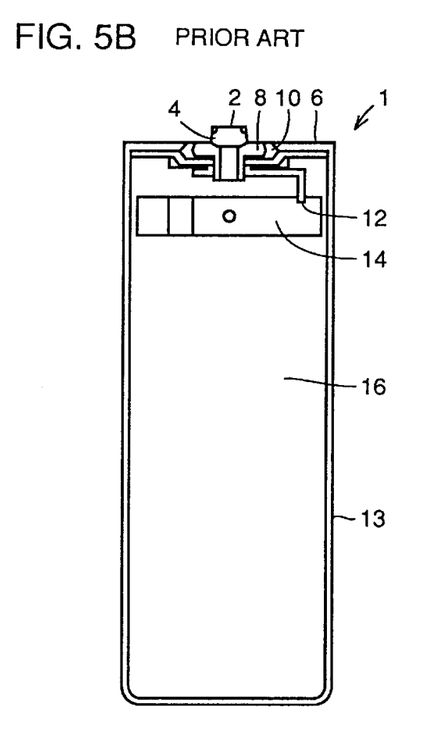
FIG. 5B is a sectional view of a side portion thereof.
Figure 5C:
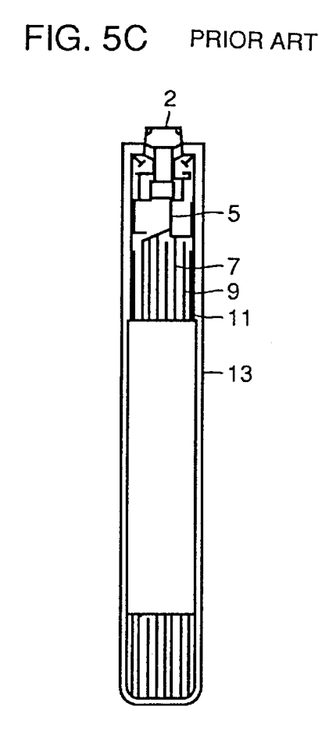
FIG. 5C is a sectional view of another side portion.

A first exemplary conventional jar can employed for a nickel-hydrogen storage battery is now described with reference to FIGS. 5A to 5C. Referring to FIGS. 5A to 5C, a bottomed battery jar can (jar can) 13 of a nickel-hydrogen storage battery 1 has an open upper end. This jar can 13 stores or contains a plate group 16 including a positive electrode 7, a positive lead tab 5, a negative electrode 11 and a separator 9. A valve element 4, a cap 2, a rivet 8, an insulating plate gasket 10, a washer 12 and a frame body 14 are provided above the plate group 16. A lid body 6 is provided on the upper end opening of the jar can 13, for electrically isolating the jar can 13 from the cap 2 through the insulating plate gasket 10.

The jar can 13 is generally prepared from a nickel-plated steel sheet. In order to cope with recent weight reduction of apparatuses or the like, a jar can prepared from aluminum or an aluminum alloy has been developed.

Figure 6:
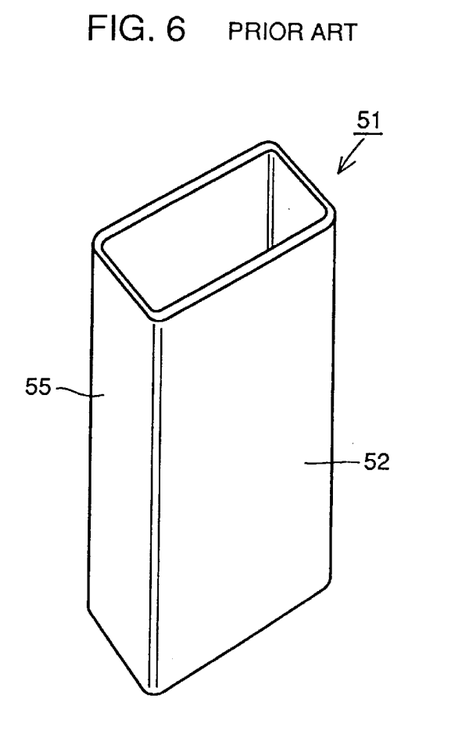
FIG. 6 is a perspective view showing another conventional jar can.

A second exemplary conventional jar can for an angular sealed battery disclosed in Japanese Patent Laying-Open No. 6-52842 (1994) is now described. Referring to FIG. 6, a bottomed angular jar can 51 has wider and narrower side surfaces 52 and 55 and an open upper end.

This jar can 51 has been provided in order to suppress deformation resulting from increase in internal pressure, in particular. Therefore, the wider side surfaces 52 are larger in thickness than the narrower side surfaces 55.

However, the aforementioned conventional jar cans 13 and 51 have the following problems:

The first exemplary jar can 13 shown in FIGS. 5B and 5C contains a positive electrode active material, a negative electrode active material and an electrolyte. Pressure is applied from the interior to the side and bottom surfaces of the jar can 13 due to generation of gas resulting from reaction between the active materials and the electrolyte or electrochemical reaction in charging of the battery 1 and swelling of the electrodes 7 and 11.

Figure 7:
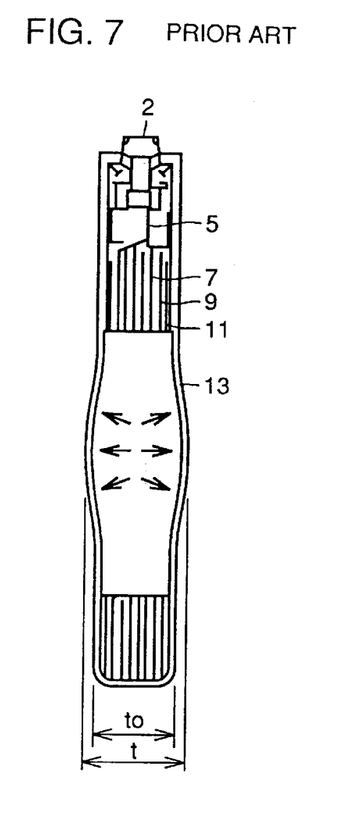
FIG. 7 is a sectional view showing swelling deformation of the jar can shown in FIGS. 5A to 5C.

At this time, the wider side surfaces of the jar can 13 are more readily deformed by the internal pressure as compared with the narrower side surfaces. Therefore, the width of each narrower side surface of the jar can 13 increases from $t_0$ to $t$ in a portion causing swelling deformation of each wider side surface, as shown in FIG. 7.

In general, an aluminum killed steel sheet (SPCE material under Japanese Industrial Standards) is employed as a nickel-plated steel sheet which is applied to a jar can. This SPCE material has a relatively large Young's modulus of about 20000 kgf/mm$^2$. Therefore, the aforementioned swelling deformation can be suppressed in a specific range by setting the thickness of the SPCE material at about 0.4 mm.

In this case, however, the jar can weighs about 7 g since the specific gravity of the SPCE material is about 7.8. Consequently, the jar can makes up about 30 to 40% of the total weight of a battery to which the same is applied, leading to a problem in weight.

When a SPCE material having a smaller thickness is applied in order to reduce the weight of the jar can, however, its rigidity is so reduced that the aforementioned swelling deformation exceeds the specific range. Thus, reduction of the thickness of the SPCE material is so limited that the weight of the jar can cannot be readily reduced.

On the other hand, the Young's modulus of a light metal such as aluminum or an aluminum alloy is about 7000 kgf/mm$^2$. This value is about ⅓ of that of the SPCE material. When a jar can is prepared from aluminum or the like in the same thickness as the SPCE material, therefore, swelling deformation of the jar can further increases to exceed the specific range.

When the thickness of the aluminum material is increased in order to increase its strength, however, the weight of the jar can is also increased. If the thickness is increased while keeping the outer dimensions unchanged, further, the volume in the jar can is reduced. Thus, the capacity of a battery to which the jar can is applied may be reduced.

To this end, a material having a high Young's modulus is studied in relation to various materials of aluminum and aluminum alloys. In the present circumstances, however, a material having a high Young's modulus is inferior in moldability for deep drawing or the like and cannot provide a practical jar can.

The second exemplary jar can 51 has been proposed in order to suppress swelling deformation, as described above. In case of molding such a jar can provided with wider and narrower side surfaces having different thicknesses by deep drawing in general, however, material sheets having portions of different thicknesses corresponding to the wider and narrower side surfaces are required. Therefore, the cost for the material sheets is so increased that the jar can cannot be economically obtained.

SUMMARY OF THE INVENTION

The present invention has been proposed in order to solve the aforementioned problems, and an object thereof is to provide a lightweight jar can for a secondary battery having high rigidity, which can suppress swelling deformation and ensure a high battery capacity.

The present invention is directed to a bottomed jar can for a secondary battery, which comprises a first layer including a sheet of aluminum or an aluminum alloy and a second layer including a sheet of iron or a ferrous alloy.

According to this structure, the first layer reduces the weight the jar can for a secondary battery, and the second layer attains high rigidity for suppressing swelling deformation. Consequently obtained is a lightweight jar can for a secondary battery having high rigidity.

Preferably, the second layer (i.e. on the two opposite major surfaces of the first layer) is formed on each side of the first layer.

In this case, flexural rigidity per constant weight of the jar can for a secondary battery is most strengthened due to the formation of the second layer on each side of the first layer, since iron or the like forming the second layer has a higher Young's modulus as compared with aluminum or the like forming the first layer.

Alternatively, the first layer is preferably formed on each side of the second layer.

In this case, the second layer containing iron or a ferrous alloy keeps the rigidity of the jar can for a secondary battery, and the first layer containing aluminum or an aluminum alloy formed on each side of the second layer reduces the weight of the jar can for a secondary battery. When the first layer is arranged inside the jar can for a secondary battery, it is possible to effectively assign the first layer to a positive electrode side of a lithium secondary battery employing an electrolyte which is not corrosion-resistant. When the first layer is arranged outside the jar can for a secondary battery, on the other hand, the jar can for a secondary battery can be readily assembled by laser welding or the like.

Preferably, the jar can for a secondary battery includes at least two clad units each formed by a set of the first and second layers.

In this case, the first and second layers are properly combined with each other to form the clad units depending on or in response to the end use of the jar can. Consequently obtained is a desired jar can for a secondary battery making the best use of lightweightness and high rigidity.

Preferably, the first and second layers are at least 0.05 mm and not more than 0.6 mm in thickness respectively, and each clad unit formed by the set of the first and second layers is at least 0.1 mm and not more than 1.2 mm in thickness.

If the first and second layers are less than 0.05 mm in thickness, the manufacturing cost is so increased that the jar can for a secondary battery is unpractical in cost. Further, it is difficult to work or handle the jar can for a secondary battery in this case. If the first and second layers are in excess of 0.6 mm in thickness, on the other hand, it is difficult to ensure an effective internal volume as well as a volume energy density of the battery and the jar can is unpractical. Therefore, the proper thickness of the clad unit is at least 0.1 mm and not more than 1.2 mm.

Preferably, a nickel-plated layer is formed on at least one surface of the second layer.

In this case, bonding strength between the second layer and another layer coming into contact with the same is stabilized and adhesion strength of the overall bonded surfaces is homogenized.

Further preferably, the nickel-plated layer is at least 3 $\mu$m and not more than 5 $\mu$m in thickness.

If the nickel-plated layer is smaller than 3 $\mu$m in thickness, pin holes or the like are so readily caused in the nickel-plated layer that corrosion resistance may be deteriorated. If the nickel-plated layer is larger than 5 $\mu$m in thickness, on the other hand, the cost for nickel plating is increased to disadvantageously increase the manufacturing cost.

Preferably, the jar can for a secondary battery has a third layer containing nickel between the first and second layers as an intermediate layer. In this case, the bonding strength between the first and second layers is highly and stably maintained.

Preferably, the third layer is a nickel-plated layer of at least 3 $\mu$m and not more than 5 $\mu$m in thickness.

The corrosion resistance is deteriorated if the nickel-plated layer is smaller than 3 $\mu$m in thickness, while the manufacturing cost is increased if the nickel-plated layer is larger than 5 $\mu$m in thickness.

Further preferably, the jar can for a secondary battery has a substantially prismatic outer shape.

In this case, the secondary battery can be efficiently stored in a limited space of a portable apparatus or the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention provides a jar can for a sealed secondary battery prepared from a clad (bonded) material (hereinafter referred to as "aluminum/iron clad") formed by cladding or bonding together a sheet of aluminum or an aluminum alloy and a sheet of iron or a ferrous alloy.

Due to the employment of the aluminum/iron clad in place of the alternative of the sheet of aluminum or an aluminum alloy or the sheet of iron or a ferrous alloy, it is possible to provide an arbitrary jar can making the best use of excellent characteristics of the sheets of aluminum or an aluminum alloy and iron or a ferrous alloy by setting the thicknesses and the materials in optimum combination dependent on or in response to the use of the jar can. The jar can would have to be increased in thickness in consideration of the strength if the same is prepared from only an aluminum material, while the weight of the jar can could not be readily reduced due to limitation in molding on reduction of the thickness if the same is prepared only from a ferrous material. The inventive jar can employing the aluminum/iron clad can advantageously solve these problems.

The sheet of aluminum or an aluminum alloy forming part of the aluminum/iron clad mainly contributes to weight reduction of the jar can, and has excellent moldability for deep drawing or the like. Such a material can be prepared from pure aluminum (No. 1000 level under JIS) or an aluminum alloy (No. 3000, 4000 or 5000 level under JIS) in response to the use of the jar can, and is economically obtainable at a low cost.

On the other hand, the sheet of iron or a ferrous alloy forming part of the aluminum/iron clad mainly contributes to high rigidity of the jar can. In other words, the sheet of iron or the like has a function of suppressing swelling deformation resulting from the low Young's modulus of aluminum with a relatively small thickness. In general, this material can be prepared from an aluminum killed steel sheet (SPCE) or a stainless steel sheet (SUS 304 or SUS 403), and is economically obtainable at a low cost.

While the number of layers forming the aluminum/iron clad is not particularly limited, a clad unit consisting of two layers of the sheets of aluminum and iron generally is the minimum structural unit. Alternatively, the clad unit may have a three-layer structure of aluminum, iron and aluminum or iron, aluminum and iron. Two or more such clad units may be stacked with each other.

In case of forming the sheets of iron and aluminum of the jar can on the inner and outer sides of the battery respectively, it is possible to ensure corrosion resistance with respect to an electrolyte in high reliability due to presence of a nickel-plated layer of at least 3 μm and not more than 5 μm in thickness on a surface (inner surface) of the sheet of iron, similarly to the case of employing a conventional nickel-plated steel sheet. Since the aluminum sheet is positioned on the outer side, further, it is possible to readily assemble the overall jar can by laser welding or the like.

In case of forming the sheets of aluminum and iron of the jar can on the inner and outer sides of the battery respectively, on the other hand, it is effective if aluminum is not corrosion-resistant with respect to the electrolyte, e.g., provided on a positive electrode side of a lithium secondary battery, for example. In such a clad structure that the iron sheet is provided on the outer side of the jar can, further, the jar can is resistant to damage and excellent in durability, while inexpensive caulking or the like can be provided for assembling of the overall jar can.

Even if the jar can of this structure is applied to an alkali storage battery, for example, and the temperature increases to about 60° C. at the maximum due to electrochemical reaction or the like in charging thereof, bending stress resulting from the difference between the thermal expansion coefficients of aluminum and iron causes stress that deforms the side surfaces of the jar can inward, thereby suppressing the outward swelling deformation resulting from an increase of the internal pressure of the jar can.

Whether the jar can has two layers, three layers or more layers, the basic physical and mechanical properties thereof substantially coincide with values calculated by mixed rules with the properties and thicknesses of the respective layers forming the aluminum/iron clad. Assuming that ρ represents specific gravity, σ represents tensile strength, E represents a modulus of longitudinal elasticity (Young's modulus), t represents a sheet thickness, c represents the aluminum/iron clad and n represents the material forming each layer, the following equations are obtained:

$$\begin{cases} \rho_c = \sum t_n \rho_n / t_c \\ \sigma_c = \sum t_n \sigma_n / t_c \\ E_c = \sum t_n E_n / t_c \end{cases}$$

Therefore, it is possible to form the jar can to have optimum values by selecting the materials for and the thicknesses of the sheets of aluminum and iron and arbitrarily combining the same with each other.

When the aluminum/iron clad has three layers of iron, aluminum or iron or more layers and the iron layers having a higher Young's modulus are formed on the inner and outer sides of the battery, it is possible to maximize the flexural rigidity per constant weight of the jar can. This effect can be attained since the flexural rigidity of the aluminum/iron clad remarkably depends on the Young's modulus on its surfaces. Thus, a lightweight jar can having high rigidity can be obtained in this case.

The jar can for a secondary battery according to the present invention includes that formed with a nickel-plated layer at least on one outer surface thereof. This nickel-plated layer is preferably at least 3 μm and not more than 5 μm in thickness. If the nickel-plated layer is smaller than 3 μm in thickness, pin holes or the like are so readily caused in the nickel-plated layer that the corrosion resistance may be deteriorated. If the nickel-plated layer is larger than 5 μm in thickness, on the other hand, the cost is disadvantageously increased due to costly nickel plating, although no remarkable problem arises in quality.

It is effective to include a nickel layer as an intermediate layer on the bonding interface between the sheets of aluminum and iron of the jar can formed by the aluminum-iron clad having two or more layers, in order to highly maintain the bonding strength between the sheets of aluminum and iron. On the bonded surfaces of the sheets of aluminum and iron, mutual diffusion of atoms is suppressed in bonding since a coat or a passive state layer of an oxide of iron or the like is present on the surface of iron or the like. If no intermediate layer is present, therefore, the bonding strength may be reduced or rendered heterogeneous.

In consideration of the aforementioned points, the aluminum/iron clad including the nickel-plated layer as an intermediate layer is prepared by forming the nickel-plated layer on the surface of aluminum and/or that of iron before bonding, and thereafter bonding the sheets of aluminum and iron to each other. Therefore, the bonding strength between the sheets of aluminum and iron is stable and the adhesion strength on the bonding interface of the aluminum/iron clad is entirely homogenized. This is inferred because an oxide layer on the nickel surface is not sufficiently strong. In consideration of this, a commercially available nickel-plated steel sheet or the like can be employed as the material for the aluminum-iron clad, for example.

This nickel-plated layer is properly at least 3 μm and not more than 5 μm in thickness. As hereinabove described, the corrosion resistance is deteriorated if the nickel-plated layer is smaller than 3 μm in thickness, while the manufacturing cost is increased if the nickel-plated layer is larger than 5 μm in thickness. The sheets of aluminum and iron forming the aluminum-iron clad are preferably in the range of at least 0.05 mm and not more than 0.6 mm in thickness respectively. If the sheets of aluminum and iron are less than 0.05 mm in thickness, the material cost is so increased that the jar can is unpractical in cost and handling such as working of the materials is difficult. These problems are practically solved when the sheets of iron and aluminum are at least 0.05 mm in thickness. If the sheets of aluminum and iron are in excess of 0.6 mm in thickness, on the other hand, it is difficult to ensure an effective internal volume as well as a volume energy density of the battery and the jar can is unpractical.

Therefore, the total thickness of the aluminum/iron clad is preferably at least 0.1 mm and not more than 1.2 mm.

Figure 1A:
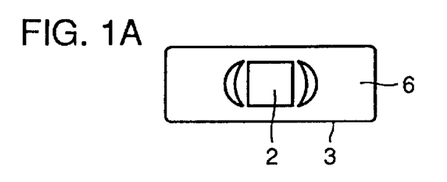
FIG. 1A is a top plan view of a jar can for a secondary battery according to an embodiment of the present invention.
Figure 1B:
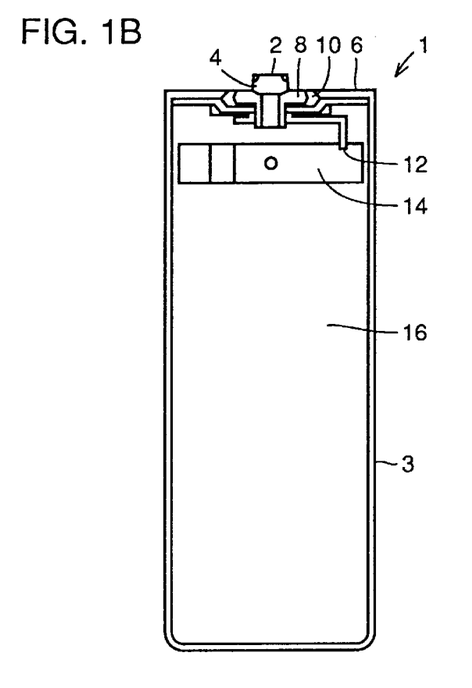
FIG. 1B is a sectional view of a side portion thereof.
Figure 1C:
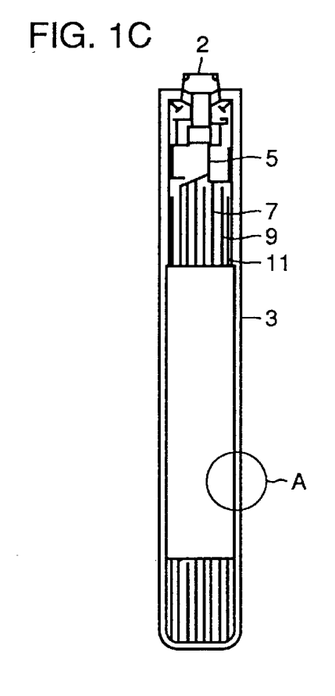
FIG. 1C is a sectional view of another side portion.
Figure 1D:
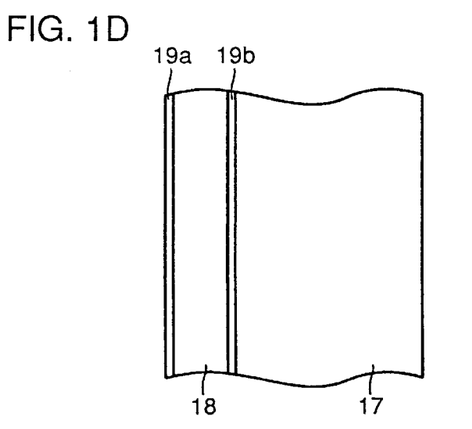
FIG. 1D is an enlarged sectional view of a part A shown in FIG. 1C.
Figure 2:
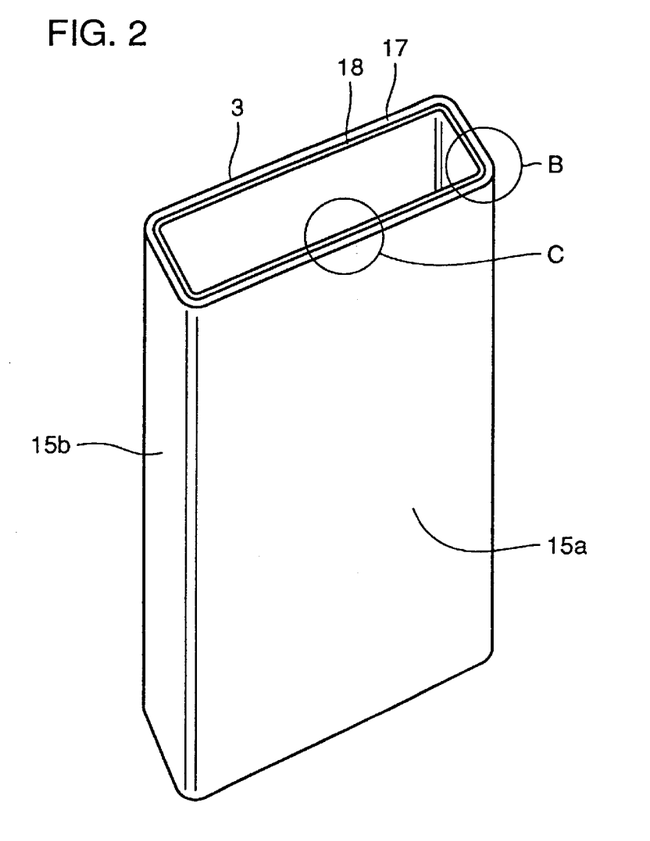
FIG. 2 is a perspective view of the jar can shown in FIGS. 1A to 1D.
Figure 3:
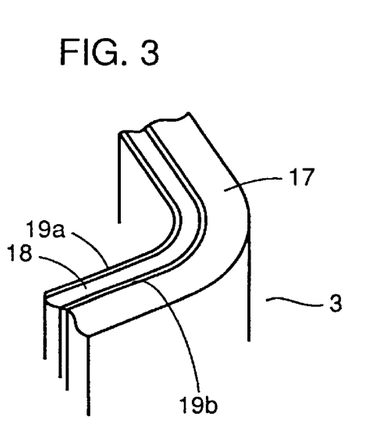
FIG. 3 is an enlarged view of a part B shown in FIG. 2.
Figure 4:
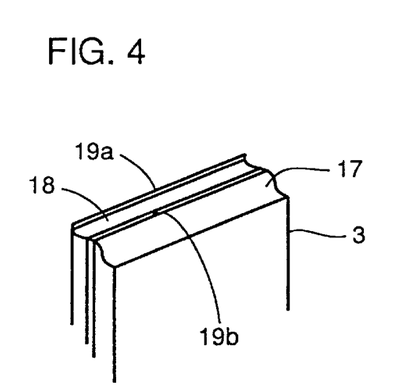
FIG. 4 is an enlarged view of a part C shown in FIG. 2.

A battery jar can (jar can) 3 for a secondary battery according to an embodiment of the present invention is now described with reference to FIGS. 1A to 1D, 2, 3 and 4 and Table 1. FIGS. 1A to 1C show an upper surface and sections of a prismatic sealed nickel-hydrogen storage battery 1. FIG. 1D is an enlarged view of a part A shown in FIG. 1C. FIG. 2 shows the appearance of the jar can 3 shown in FIGS. 1A to 1D. FIGS. 3 and 4 are enlarged views of parts B and C shown in FIG. 2 respectively.

In particular, a sheet 17 of aluminum and a sheet 18 of iron are formed on outer and inner side surfaces of the jar can 3 respectively. A nickel layer 19a is formed on an inner surface of the iron sheet 18. Another nickel layer 19b is formed between the iron sheet 18 and the aluminum sheet 17. In Examples described below, various materials and thicknesses are applied to such sheets 17 and 18 of aluminum and iron as shown in Table 1.

Referring to FIGS. 1A to 1C, components other than the jar can 3 are identical in structure to those of the sealed nickel-hydrogen storage battery 1 shown in FIGS. 5A to 5C described with reference to the prior art, and hence identical members are denoted by the same reference numerals, to omit redundant description.

As shown in FIGS. 1A to 1C, the jar can 3 containing therein a positive electrode 7, a negative electrode 11, a separator 9 and an electrolyte (not shown) serving as generators was connected with a battery terminal through a lead wire, and thereafter a lid provided with a valve element 4 was mounted by laser welding for preparing a completely sealed secondary battery. In this case, the jar can made up about 26% of the total weight of the secondary battery. Thus, the weight of the jar can was remarkably reduced as compared with that of a conventional jar can employing a nickel-plated steel sheet making up about 40% of the total weight of a battery, to reduce the weight of the secondary battery as a result.

The weight energy density of the secondary battery employing this jar can was 50 Wh/kg. It means that the weight energy density was improved by about 20% as

TABLE 1

|  |  | Al Part of Clad | | Fe Part of Clad | | Total | | | Weight | | |
|---|---|---|---|---|---|---|---|---|---|---|---|
|  | No. | Material | Thickness (mm) | Material | Thickness (mm) | Number of Layers | Thickness (mm) | Dimensions of Jar Can (mm) Width × Height × Thickness | Specific Gravity | Weight of Jar Can (g) | Young's Modulus (kgf/mm$^2$) |
| Example | 1 | A1050 | 0.3 | Ni-plated steel plate | 0.1 | 2 | 0.4 | 17 × 48 × 6 | 3.99 | 3.3 | 10188 |
|  | 2 | A3003 | 0.45 | Ni-plated steel plate | 0.15 | 2 | 0.6 | 40 × 48 × 8 | 4.07 | 9.3 | 10360 |
|  | 3 | A1050 | 0.4 | Ni-plated steel plate | 0.1 | 3 | 0.6 | 40 × 48 × 8 | 4.40 | 10.1 | 11233 |
|  | 4 | A3003 | 0.3 | Ni-plated steel plate | 0.1 | 3 | 0.5 | 40 × 48 × 8 | 4.74 | 9.1 | 12208 |
|  | 5 | A1100 | 0.4 | Ni-plated steel plate | 0.05 | 3 | 0.5 | 40 × 48 × 8 | 3.73 | 7.1 | 9560 |
|  | 6 | A3003 | 0.28 | Ni-plated steel plate | 0.06 | 3 | 0.4 | 40 × 48 × 8 | 4.32 | 6.6 | 10976 |
|  | 7 | A3003 | 0.25 | Ni-plated SUS | 0.05 | 3 | 0.35 | 40 × 48 × 8 | 4.32 | 6.6 | 11062 |
|  | 8 | A3003 | 0.5 | Ni-plated SUS | 0.1 | 2 | 0.6 | 40 × 48 × 8 | 3.67 | 8.4 | 9453 |
|  | 9 | A1050 | 0.3 | Ni-plated SUS | 0.1 | 2 | 0.4 | 17 × 48 × 6 | 4.03 | 3.3 | 10368 |
|  | 10 | A3003 | 0.25 | Ni-plated steel plate | 0.05 | 3 | 0.35 | 17 × 48 × 6 | 4.20 | 3.5 | 10853 |
|  | 11 | A3003 | 0.2 | Ni-plated SUS | 0.05 | 3 | 0.30 | 17 × 48 × 6 | 4.53 | 3.7 | 11583 |
|  | 12 | A3003 | 0.2 | Ni-plated steel plate | 0.1 | 3 | 0.5 | 40 × 48 × 8 | 3.73 | 7.1 | 9200 |
| Comparative | 13 | none | — | Ni-plated steel plate | 0.4 | 1 | 0.4 | 17 × 48 × 6 | 7.86 | 6.5 | 19600 |
| Example | 14 | A3003 | 0.6 | none | — | 1 | 0.6 | 40 × 48 × 8 | 2.80 | 6.4 | 7280 |
|  | 15 | none | — | Ni-plated steel plate | 0.4 | 1 | 0.4 | 40 × 48 × 8 | 7.86 | 12.0 | 19600 |

EXAMPLE 1

Referring to Example No. 1 in Table 1, a clad sheet of 100 by 100 mm having a thickness of 0.4 mm was prepared by diffusion-bonding a pure aluminum sheet (corresponding to A1050 under JIS) of 0.3 mm in thickness and an aluminum killed steel sheet of about 0.1 mm in thickness, having nickel-plated layers of about 4 μm in thickness on both surfaces, to each other.

This clad sheet was deep-drawn for preparing a prismatic jar can for a nickel-hydrogen storage battery of 17 mm in width, 48 mm in height and 6 mm in thickness (17 by 48 by 6 mm) with the pure aluminum sheet and the aluminum killed steel sheet provided on outer and inner sides of the battery respectively. The clad sheet was so excellently deep-drawn that no defect such as cracking, creasing or peeling was recognized thereon.

The weight of this jar can was about 3.3 g. It means that the weight was reduced by about 49% as compared with a conventional jar can of 6.5 g in weight employing a nickel-plated steel sheet of 0.4 mm in thickness.

compared with that of 42 Wh/kg of the conventional battery. However, the thickness of the jar can was set at 0.4 mm similarly to that of the conventional one. Thus, it was impossible to improve an effective internal volume of the jar can and the volume energy density.

The characteristics of the secondary battery to which this jar can was applied were evaluated and compared with those of a conventional battery. Charge/discharge characteristics, life and preservability of the secondary battery were substantially equivalent to those of the conventional battery. Further, swelling and deformation of the jar can resulting from increase of the internal pressure of the battery in charging were evaluated, to observe swelling on wider side surfaces of the jar can when the internal pressure was about 5 kg/cm$^2$. However, this swelling was smaller than an abnormal level of 0.5 mm and caused no problem in practice.

EXAMPLE 2

Referring to Example No. 2 in Table 1, a clad sheet of 100 by 100 mm having a thickness of 0.6 mm was prepared by diffusion-bonding a sheet of an aluminum alloy (corresponding to A3003 under JIS) of 0.45 mm in thickness and an aluminum killed steel sheet of 0.15 mm in thickness, having nickel-plated layers of about 4 μm in mean thickness on both surfaces, to each other.

This clad sheet was deep-drawn for preparing a prismatic jar can for a lithium ion storage battery of 40 by 48 by 8 mm with the aluminum alloy sheet and the aluminum killed steel sheet provided on outer and inner sides of the battery respectively. The clad sheet was so excellently deep-drawn that neither cracking, creasing, peeling nor remarkable damage of the nickel-plated layers was recognized thereon. The weight of this jar can was 9.3 g. It means that the weight was reduced by about 23% with respect to the weight of about 12 g in a conventional jar can employing a nickel-plated steel sheet.

A lid was provided on this jar can by caulking and pressure was intentionally applied to the interior of the jar can which was brought into a sealed state, for evaluating swelling and deformation thereof. Swelling was observed on wider side surfaces of the jar can when the internal pressure thereof was about 5 kg/mm$^2$. However, this swelling was smaller than an abnormal level of 0.5 mm and caused no problem in practice.

Generators were arranged in the jar can for preparing a completely sealed lithium ion secondary battery. The characteristics of the battery to which the jar can was applied were evaluated and compared with those of a conventional battery. Charge/discharge characteristics, life and preservability of the battery were substantially equivalent to those of the conventional battery.

For the purpose of comparison, on the other hand, another jar can was prepared from only a sheet of an aluminum alloy (corresponding to A3003 under JIS), as shown on the row of No. 14 in Table 1. This jar can was electrically connected with a positive electrode. Due to the exclusive employment of the aluminum alloy, this jar can was further reduced in weight as compared with the aforementioned jar can employing the aluminum/iron clad sheet or the conventional jar can employing a nickel-plated steel sheet.

However, wider side surfaces of this jar can remarkably swelled undoubtedly due to pressure increase in its interior, and it has been recognized that the jar can employing only an aluminum alloy sheet is disadvantageous in pressure resistance/strength. When a necessary thickness of the jar can is ensured while keeping the outer dimensions unchanged for maintaining pressure resistance/strength, the effective internal volume of the jar can is reduced. In this case, therefore, the volume energy density of a battery to which the jar can is applied is remarkably reduced.

As understood from Example 2, a nonaqueous lithium battery can be reduced in thickness while keeping the strength and the weight unchanged according to the present invention. Thus, the jar can according to the present invention exhibits superior characteristics particularly when the same is applied to a prismatic lithium secondary battery.

While the nickel-plated layers were 4 μm in thickness in Examples 1 and 2, the proper thickness of the nickel-plated layers is at least 3 μm and not more than 5 μm. If the nickel-plated layers are smaller than 3 μm in thickness, pin holes or the like are readily caused in the nickel-plated layers to result in a problem in corrosion resistance or the like. If the nickel-plated layers are larger than 5 μm in thickness, on the other hand, the manufacturing cost is increased due to costly nickel plating, although no remarkable problem arises in quality.

EXAMPLES 3 TO 12

Jar cans were prepared under conditions shown in the rows of Nos. 3 to 12 in Table 1, and batteries to which the jar cans were applied were evaluated similarly to Examples 1 and 2. In every jar can, the aluminum/iron clad exhibited excellent moldability in deep drawing. When the internal pressure of the battery was 5 kg/cm$^2$, swelling of the jar can was smaller than an abnormal level of 0.5 mm and caused no problem in practice.

For the purpose of comparison, Table 1 shows numerical values of conventional jar cans employing only nickel-plated steel sheets and an aluminum sheet in the rows of Nos. 13 to 15. The jar cans Nos. 13 and 15 were relatively heavy, and the jar can No. 14 swelled and caused a problem in effective internal volume.

According to the present invention, swelling deformation of wider side surfaces of a jar can resulting from increase of its internal pressure can be reduced as compared with a conventional jar can employing only an aluminum sheet, while it is possible to reduce the weight of the jar can as compared with that of a jar can employing an iron sheet.

A battery to which the inventive jar can is applied is miniature, lightweight and excellent in portability and causes less local deformation of its side surfaces despite its prismatic shape. Thus, it is possible to prevent such inconvenience whereby the battery cannot be taken out from an apparatus in which it is arranged or stored.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A jar can including a side wall and a bottom for a secondary battery, comprising at least one clad unit which comprises a first layer and a second layer that are cladded onto each other, wherein said first layer includes a sheet of aluminum or an aluminum alloy, and said second layer includes a sheet of iron or a ferrous alloy.

2. The jar can for a secondary battery in accordance with claim 1, further comprising another layer that includes another sheet of iron or a ferrous alloy and that is arranged on a side of said first layer opposite said second layer.

3. The jar can for a secondary battery in accordance with claim 1, further comprising another layer that includes another sheet of aluminum or an aluminum alloy and that is arranged on a side of said second layer opposite said first layer.

4. The jar can for a secondary battery in accordance with claim 1, including at least two of said clad units each respectively formed by a set of a respective one of said first layer and a respective one of said second layer.

5. The jar can for a secondary battery in accordance with claim 1, wherein said first layer and said second layer each respectively have a thickness of at least 0.05 mm and not more than 0.6 mm, and said clad unit has a thickness of at least 0.1 mm and not more than 1.2 mm.

6. The jar can for a secondary battery in accordance with claim 1, further comprising a nickel-plated layer formed on at least one surface of said second layer.

7. The jar can for a secondary battery in accordance with claim 6, wherein said nickel-plated layer has a thickness of at least 3 μm and not more than 5 μm.

8. The jar can for a secondary battery in accordance with claim 1, further comprising an intermediate third layer containing nickel between said first layer and said second layer.

9. The jar can for a secondary battery in accordance with claim 8, wherein said third layer having a thickness is a nickel-plated layer of at least 3 μm and not more than 5 μm.

10. The jar can for a secondary battery in accordance with claim 1, having a substantially prismatic outer shape.

11. The jar can for a secondary battery in accordance with claim 1, wherein said clad unit consists of said first layer and said second layer, and said jar can consists of a single one of said clad unit.

12. The jar can for a secondary battery in accordance with claim 1, wherein said first layer consists of aluminum and said second layer consists of iron.

13. The jar can for a secondary battery in accordance with claim 1, wherein said sheet of iron or a ferrous alloy is a sheet of plain or stainless steel, said second layer further includes a nickel plating on said sheet of plain or stainless steel, and said second layer consists of said sheet of plain or stainless steel with said nickel plating thereon.

14. The jar can for a secondary battery in accordance with claim 13, wherein said nickel plating is provided on two opposite major surfaces of said sheet of plain or stainless steel.

15. The jar can for a secondary battery in accordance with claim 1, wherein said first layer has a thickness of at least 0.2 mm and not more than 0.5 mm, said second layer has a thickness of at least 0.06 mm and not more than 0.15 mm, and said clad unit has a total thickness of at least 0.3 mm and not more than 0.6 mm.

16. The jar can for a secondary battery in accordance with claim 1, wherein said first layer has a thickness of at least 0.25 mm and not more than 0.45 mm, said second layer has a thickness of at least 0.1 mm and not more than 0.15 mm, and said clad unit has a total thickness of at least 0.35 mm and not more than 0.6 mm.

17. The jar can for a secondary battery in accordance with claim 16, wherein said thickness of said first layer is at least 0.3 mm and not more than 0.4 mm, and said total thickness of said clad unit is at least 0.4 mm.

18. The jar can for a secondary battery in accordance with claim 1, wherein said first layer and said second layer are cladded onto each other by diffusion bonding.

19. A method of making the jar can for a secondary battery in accordance with claim 1, comprising the following steps:

a) providing said sheet of aluminum or an aluminum alloy as said first layer;

b) providing a nickel-plated plain or stainless steel sheet as said second layer;

c) diffusion bonding said first layer and said second layer to each other to form thereof a clad sheet as said clad unit; and d) deep drawing said clad sheet to form thereof said jar can.

* * * * *

UNITED STATES PATENT AND TRADEMARK OFFICE
CERTIFICATE OF CORRECTION

PATENT NO. : 6,127,064

DATED : October 3, 2000

INVENTOR(S) : Shibata et al.

It is certified that error appears in the above-identified patent and that said Letters Patent is hereby corrected as shown below:

On the Title Page: under [73], Assignees:
    line 2, before "Matsushita", replace "Kadoma" by --Osaka--;
    line 3, after "Ltd.,", replace "Osaka" by --Kadoma--;

Col. 2,    line 61,   after "layer", delete "(i.e. on the two opposite--;
              line 62,   before "is", delete "major surfaces of the first layer)";
              line 63,   after "layer", insert --(i.e. on the two opposite major surfaces of the first layer)--;

Col. 11,   line 2,   after "layer", delete "having a thickness";
              line 3,   after "layer", insert --having a thickness--.

Signed and Sealed this

Twenty-fourth Day of April, 2001

Attest:

NICHOLAS P. GODICI

*Attesting Officer*      *Acting Director of the United States Patent and Trademark Office*